United States Patent

[11] 3,596,454

| [72] | Inventor | Wallace Kluck<br>Route 1, Rothsay, Minn. 56579 |
|---|---|---|
| [21] | Appl. No. | 834,413 |
| [22] | Filed | June 18, 1969 |
| [45] | Patented | Aug. 3, 1971 |

[54] DIVIDER BOARD FOR WINDROWER
3 Claims, 4 Drawing Figs.

| [52] | U.S. Cl. | 56/314 |
|---|---|---|
| [51] | Int. Cl. | A01d 63/04 |
| [50] | Field of Search | 56/314, 318—320 |

[56] References Cited
UNITED STATES PATENTS

| 412,102 | 10/1889 | Lamrock | 56/318 |
|---|---|---|---|
| 999,452 | 8/1911 | Honey | 56/320 |
| 1,302,768 | 5/1919 | Crane | 56/319 |
| 1,882,875 | 10/1932 | Pierson | 56/320 |
| 2,044,396 | 6/1936 | Perau | 56/314 UX |
| 2,203,418 | 6/1940 | Mills | 56/320 |
| 2,814,174 | 11/1957 | Zimmer | 56/314 |

Primary Examiner—Louis G. Mancene
Assistant Examiner—J. A. Oliff
Attorney—Williamson, Palmatier & Bains ABSTRACT: For use on a windrower, an improved grain divider having a grain separating nose portion projecting forwardly in front of the windrower's cutting sickle and a substantially upright divider section projecting rearwardly over a grain-receiving conveyor, the divider section terminating in front of the rear frame structure of the transverse platform on which the conveyor is supported, thereby providing an unobstructed discharge opening through which cut grain stalks may drop freely onto the canvas conveyor.

INVENTOR.
WALLACE KLUCK
BY
Williamson, Palmatier
& Bains
ATTORNEYS

PATENTED AUG 3 1971

INVENTOR.
WALLACE KLUCK
BY Williamson, Palmatier
& Bains
ATTORNEYS

DIVIDER BOARD FOR WINDROWER

BACKGROUND OF THE INVENTION

Harvesting machines known as windrowers conventionally employ a reciprocally mounted cutting sickle in combination with a rotary reel to cut grain stalks and force them rearwardly onto a transversely moving conveyor belt which carries the grain to a discharge opening through which the grain stalks drop onto the ground in the form of a windrow. The conveyor and cutting sickle are supported on a platform, and grain dividers in the nature of fenders are normally mounted at the opposite sides of the platform adjacent the opposite ends of the cutting sickle. It is the function of the dividers to separate grain stalks as the windrower is propelled through a field, and to assist in guiding the cut stalks rearwardly onto the canvas conveyor. On presently available windrowers, the dividers are secured in place and supported by braces, supports, or portions of the upright dividers which extend rearwardly along the opposite sides of the conveyor platform and are attached to an upright wall or frame structure at the rear of the platform. This arrangement has the distinctive disadvantage that grain stalks moving rearwardly over the dividers get hung up and caught on the rearwardly extending support structure. As grain cuttings accumulate on the support portion of the divider board, they interfere with the windrowing operation by blocking the movement of additional grain stalks onto the conveyors and by plugging the space between the ends of the rotary reel and the divider walls. The divider design of this invention overcomes these difficulties by means of a divider structure which is so constructed and arranged as to permit and induce the unimpeded movement of cut grain stalks onto the conveyor.

BRIEF SUMMARY OF THE INVENTION

The divider of this invention is particularly characterized by an upright divider assembly which is mounted on a windrower in such a way as to provide an unobstructed discharge space at the rear end of the divider through which grain stalks may drop freely and continuously onto a canvas conveyor belt. The divider is so designed as to direct cut grain stalks rearwardly and downwardly onto the conveyor.

These basic objectives are realized by terminating the divider assembly in front of the upright wall at the rear of the conveyor platform and supporting the divider entirely from the front end of the platform, thereby providing an open space between the rear end of the divider assembly and the wall or frame structure at the rear of the platform, this space providing an unobstructed discharge opening through which grain stalks may fall onto the conveyor.

My divider apparatus includes a ground-engaging skid which supports an upright divider section having a forwardly projecting, grain-separating nose portion from which its top edge slopes upwardly and rearwardly at a relatively small angle to the horizontal The slight angle at which the upper edge of the divider rises rearwardly insures that the divider structure will offer minimum resistance to the rearward movement of grain stalks onto the windrower conveyor.

A particularly beneficial feature of my improved divider board design resides in the use of an extension bar which projects downwardly and inwardly over the conveyor belt from the top, rear end of the divider section and serves to guide grain stalks onto the conveyor.

These and other objects and advantages of my invention will become readily apparent as the following description is read in conjunction with the accompanying drawings wherein like reference numerals have been used to describe like elements throughout the several views.

DESCRIPTION OF THE PREFERRED EMBODIMENT

Figure 1:
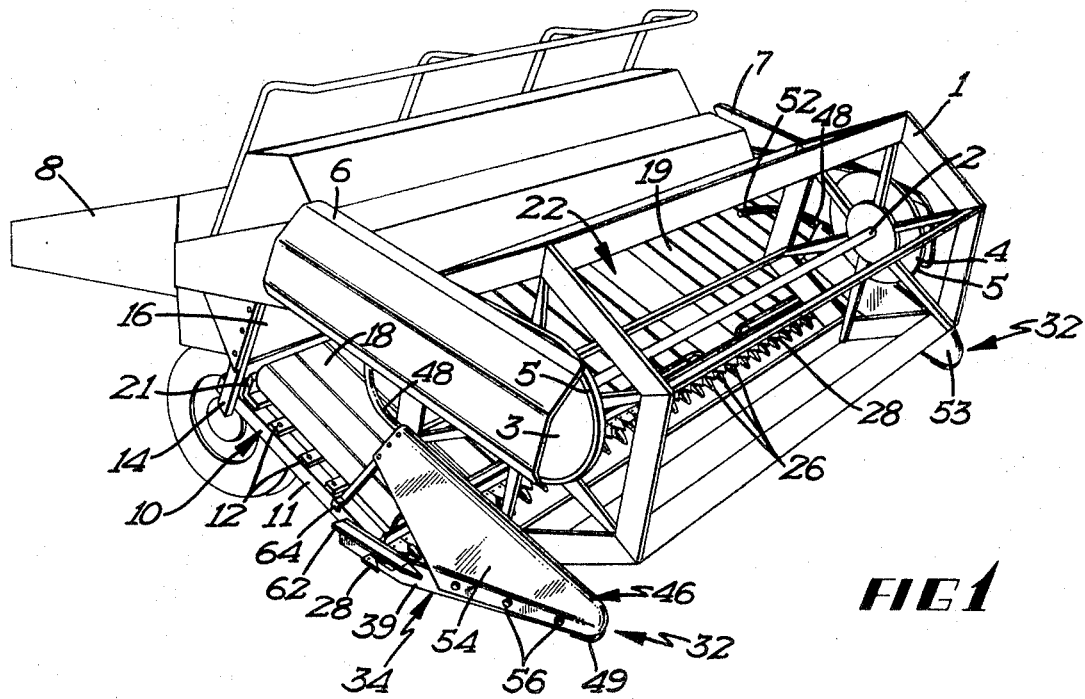
FIG. 1 is a perspective view showing the front end of a windrower having my improved dividers mounted thereon.

In FIG. 1, I have shown my improved divider structure mounted on a windrower having a conventional grain reel 1 rotatably supported on substantially horizontal shaft 2. Shaft 2 is journaled at its opposite ends in sheave wheels 3 and 4 driven by belts 5 which extend around drive sheaves and a power shaft supported at the inner ends of belt housings 6 and 7. The drive sheave and power shaft arrangement is not shown, as it is conventional and forms no part of this invention. The rearwardly extending frame 8 of the windrower is secured to the forward end of the frame of a wheeled tractor, with a power takeoff from the tractor engine being utilized to supply power to rotary reel 1. The windrower-tractor combination is preferably an integral unit of the self-propelled windrower type. The windrower includes a platform 10 comprised of a frame assembly having forwardly, extending side beams 11 and cross braces 12 extending therebetween.

Figure 2:
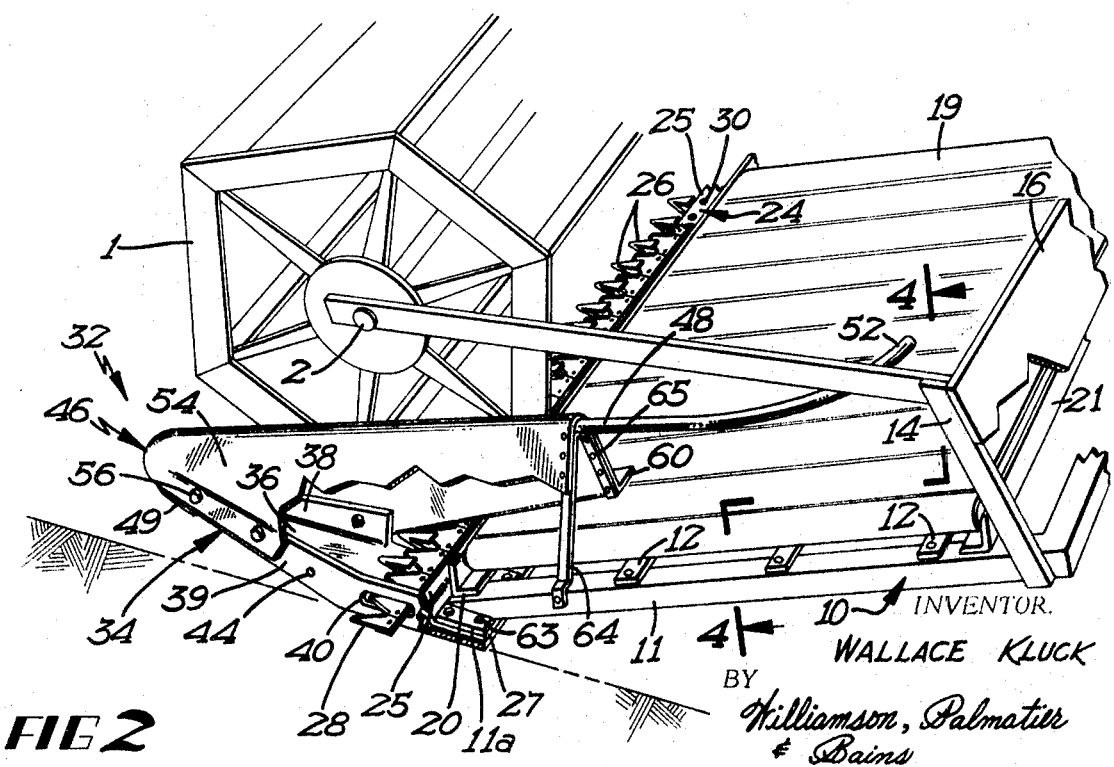
FIG. 2 is an end, perspective view of the windrower of FIG. 1 showing the manner in which one of the divider assemblies is mounted on and supported from the windrower platform.

Reference should now be had to both FIGS. 1 and 2 for a clear understanding of the windrower platform structure. At the rear of platform 10 is an upright frame structure which may take various forms, and which is illustrated as comprising upright end braces 14 between which a substantially upright rear wall 16 is supported. In order to catch cut grain stalks and deposit them on the ground in a windrow, a pair of canvas conveyor belts 18 and 19 are utilized in a conventional manner. Belts 18 and 19 are movably supported on rollers journaled at their opposite ends in transversely extending, angle iron members 20 and 21 extending across platform side beams 11. Conveyor belts 18 and 19 are driven inwardly towards each other by a power takeoff from the drive vehicle and are separated at their inner ends by a discharge space 22 through which grain may drop onto the ground in a windrow formation.

Attached to the underside of the front, angled end of platform side beams 11 is a cutter bar 24 which angles upwardly to a raised forward edge 25, as appears most clearly in FIG. 2. Cutter bar 24 constitutes the forward cross brace of platform 10 and serves to support a plurality of sickle guards 26. Guards 26 preferably take the form of forwardly projecting, pointed members having transverse openings therein within which a laterally reciprocal cutting sickle 28 is slidably supported. In addition to supporting sickle 28, guards 26 protect sickle 28 from rocks and irregular terrain. Each of the guards 26 includes a base bracket (not shown) which abuts against the underside of forward edge 25 of cutter bar 24 and is fastened thereto by bolts 30.

Figure 3:
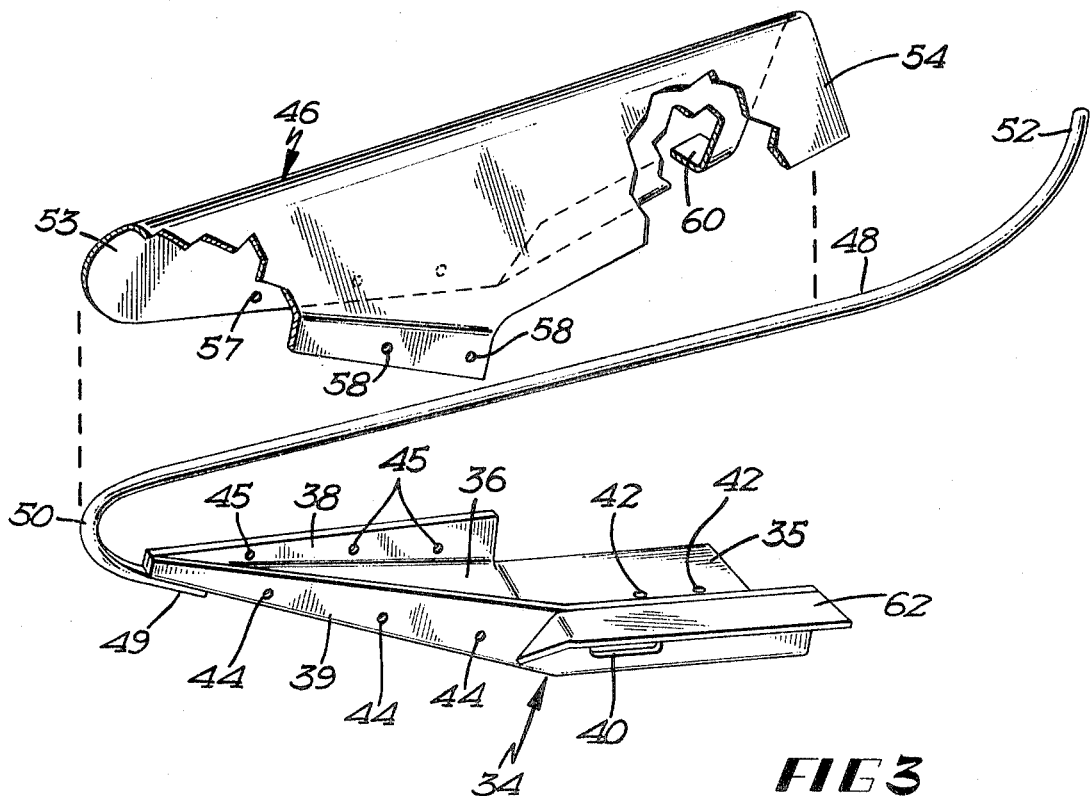
FIG. 3 is an exploded, side elevation view of the divider structure.

In FIG. 1, I have shown a pair of my improved grain dividers 32 mounted at the opposite sides of platform 10. The structure of grain dividers 32 is best shown in FIG. 3, and is comprised of a shoe or base skid 34 having a ground-engaging rear portion 35 and a forwardly extending nose portion 36. Forward portion 36 of a base skid 34 is substantially V-shaped, and angles upwardly from its juncture with ground-engaging portion 35 in order to hold the forward end of the divider assembly above the ground, as appears most clearly in FIG. 2. Base skid 34 is preferably formed from a single piece of sheet steel of at least one quarter inch thickness. It further includes upwardly extending sidewalls 38 and 39 which are integral portions of raised, forward section 36. Because sidewalls 38 and 39 are formed by turning the outer edge portions of forward skid section 36 upwardly after it has been given its V-shape, they necessarily taper downwardly to their point of intersection at the apex of forward skid section 36. In order to provide clearance space for cutter guards 26 and sickle 28, inside skid wall 38 terminates at its rear end substantially at the rear edge of forward skid section 36. Also, outer skid wall 39 includes a substantially horizontally extending slot 40 through which sickle 28 reciprocates as is explained more clearly below with respect to FIG. 2. Rear, ground-engaging section 35 of base skid 34 has a plurality of bolt holes 42 drilled therethrough in order to provide for the attachment of skid 34 to platform frame 10 of the windrower. Holes 44 and 45 in skid walls 38 and 39 are utilized to attach divider board 46 thereto. In order to provide for the proper support of divider board 46, a rod or bar 48 is attached to the underside of the front end of V-shaped section 36 of base skid 34 at one end 49 thereof, preferably by welding. Support rod 48 is contoured so as to form a forwardly projecting, grain-separating nose portion 50 at the front end thereof. Rod 48 extends upwardly and rearwardly from nose portion 50, and terminates at its rear end at an inwardly and downwardly turned extension 52 which serves a purpose explained below with respect to FIG. 2. Divider board 46 is preferably comprised of a single piece of sheet metal folded over the top of support bar 48 to thereby provide two downwardly depending, spaced-apart panel sections 53 and 54. Divider board 46 is secured in place by attaching the lower edges of side panels 53 and 54 to upright walls 38 and 39 of base skid 34. This is preferably accomplished by fastening bolts 56 through holes 57 and 58 in the lower edges of panel sections 53 and 54 and aligned holes 44 and 45 in skid walls 38 and 39. It will thus be seen that rod 48 and base 34 serve as a support means for divider board 46. One of the fully assembled grain dividers 32 is shown in FIG. 2.

Referring again to FIG. 3, it will be noted that the forward ends of panel sections 53 and 54 of divider board 46 are rounded to conform to the shape of nose portion 50 of support board 48, to which they may be secured as by tack welding. Inside divider board panel 53 further includes an outwardly turned lip 60 along the rear portion of its bottom edge. A portion of the outside panel section 54 is broken away in FIG. 3 in order to show the point where lip 60 terminates, which substantially coincides with the rear edge of inside wall 38 of skid 34. The rear portion of upright skid wall 39, within which slot 40 is formed, is reinforced by a bracing plate 62 welded to the upper edge thereof and extending substantially at right angles thereto. Reinforcing plate 62 not only serves to strengthen skid wall 39, but also functions to act as a fender and deflect grain away from the end of sickle 28 as it reciprocates through slot 40 so that grain stalks outside of dividers 32 will not be cut.

The manner in which grain dividers 32 are mounted on the windrower will now be described with reference to FIGS. 2 and 4 wherein the mounting arrangement for the left side divider is illustrated. In order for divider assemblies 32 to accomplish the improved function contemplated by this invention, it is imperative that they be supported entirely from the front end of platform frame 10, with no rearwardly extending braces or support members of any kind being utilized. The sturdy, substantially self-supporting divider assembly structure comprised of base skid 34 and divider board support rod 48 permits me to accomplish this objective in a relatively simple manner. Base skid 34 is secured to the front of platform frame 10 by extending rear, ground-engaging portion 35 thereof under rear segment 27 of cutter bar 24 and securing it thereto by means of bolts 63 fastened through holes 42. The front end of platform side beams 11 is cut off at an angle as indicated in FIG. 2, and a mounting plate 11a is welded to the underside thereof. Bolts 63 secure both skid end portion 35 and cutter bar rear end segment 27 to the underside of plate 11a in the manner shown in FIG. 4. Rearwardly extending end 27 of cutter bar 24 lies flush against the underside of mounting plate 11a. Bolts 63 will normally be utilized to attach divider assemblies 32 to existing windrowers. When dividers 32 are installed as original equipment, it may be preferable to make base skids 34 an integral part of platform frame 10 by welding the rear portion 35 thereof to mounting plates 11a of frame beams 11 and to rear segment 27 of cutter bar 24.

The aforesaid secure mounting of base skid 34 to the underside of platform frame member 11 and cutter bar base portion 27 will normally provide more than adequate support for divider assemblies 32. Because support bar or rod 48 is substantially self-supporting in the upwardly angling shape as shown, and because divider board 46 is securely supported thereon, no additional braces are required to hold divider assemblies 32 in place. Where added strength and rigidity are desired, a supplementary support in the form of a metal strap 64 may be employed in the manner shown in FIGS. 2 and 4 to lend support to the rear ends of panel sections 53 and 54. The bottom end of support strap 64 is attached to the side of platform side beam 11, and fasteners 65 serve to secure the upper portions of strap 64 to panel sections 53 and 54.

Figure 4:
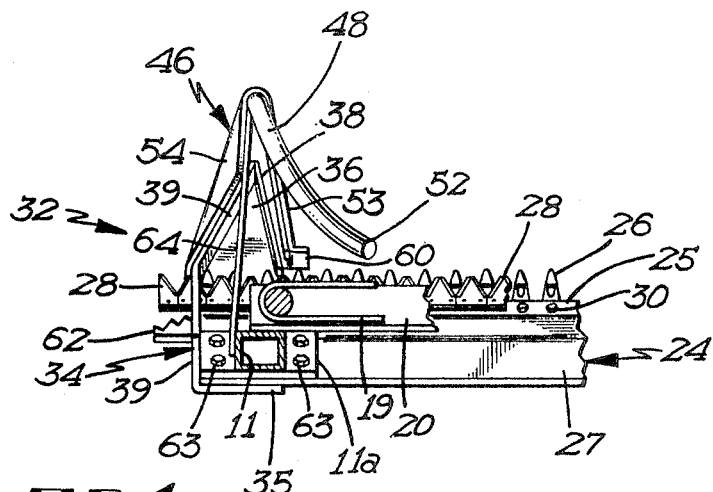
FIG. 4 is a vertical section view taken along lines 4—4 of FIG. 2 and showing the rear or inside end of the divider assembly relative to the conveyor platform.

Side panel sections 53 and 54 of divider board 46 slope outwardly and downwardly from support bar 48 as clearly appears in FIGS. 3 and 4. The inwardly, inclined disposition of panel section 53 insures that cut grain stalks moving rearwardly over the top of divider board 46 will drop freely therefrom onto canvas conveyors 18 and 19, conveyor portion 19 being shown in FIGS. 2 and 4. Extension 52 of support bar 48 projects rearwardly from the top of divider board 46 and angles downwardly and inwardly over conveyor belt 19. It is to be noted that the rear end portion of divider board 46 extends over at least a portion of the width of conveyor belt 19, this arrangement being necessary to insure that cut grain stalks will be carried rearwardly a sufficient distance and that they will be deposited onto the conveyor belts as they drop from divider board 46.

As a windrower having a pair of my improved divider assemblies 32 mounted thereon as described above is propelled through a field, the forwardly projecting nose portion of divider assemblies 32, defined by rounded, forward end 50 of support bar 48, will engage and separate grain stalks which are bent over and entangled. Forward end 36 of skid 34 is angled upwardly at a slight angle which will position the nose portion of divider assemblies 32 approximately 3 to 5 inches above the ground. This arrangement insures that the forward nose portion of the dividers 32 will be elevated sufficiently to clear ground obstacles, but that nose portion 50 will be close enough to the ground to engage and separate entangled grain stalks which are intermeshed close to the ground. Straight, upright grain stalks will pass easily on both sides of any divider board with substantially no problem. However, a separation and plugging problem arises when grain is bent over close to the ground and must be separated by the forward end of the divider board. Many presently available divider boards rise sharply from their front, nose portions and are supported at their rear ends by various braces and frame members which extend rearwardly along the sides of the platform frame to the rear wall thereof. Such divider board designs hinder the rearward movement of cut grain stalks, and as the stalks do finally move rearwardly, they become caught on the rear support portions of the divider board. This interferes with the operation of the windrower by blocking the movement of additional grain stalks onto the conveyor belts and by tending to plug the space between the ends of rotary reel 1 and the divider boards. The windrower must then be stopped frequently to remove the accumulated grain stalks from the divider board so that the windrowing operation can continue properly. In my improved divider design, I have eliminated these difficulties by supporting divider assemblies 32 entirely from the front end portions of platform frame 10 and utilizing no rearwardly extending braces or support members of any kind projecting to rear wall 16 on which cut grain stalks may accumulate. As is clearly shown in FIG. 2, the rear ends of divider board panel sections 53 and 54 terminate over conveyor belt 19 a considerable distance in front of rear frame members 14 and backwall 16 of the windrower platform. By virtue of this arrangement, I provide a large open space between the rear end of divider board 46 and rear wall structure 14, 16 through which cut grain stalks may drop unimpeded onto the conveyor belts. Moreover, the relatively low angular profile of divider assemblies 32, as defined by upwardly and rearwardly angling support bar 48, insures that grain will flow back over the top of divider board 46 smoothly and freely without getting hung up on the divider board, as is the case with present, sharply rising divider boards.

As the windrower moves through a grain field, nose portion 50 of divider assemblies 32 picks up the tangled grain close to the ground, and grain stalks which are bent from the outside of the grain dividers 32 inwardly are deflected to the outside of sickle 28 and rotary reel 1 by outside divider board panel sections 54. Grain stalks which are within the cutting swath of sickle 28 and are bent over from the inside of divider assemblies 32 towards the outside thereof will be cut off by reciprocating sickle 28 and move rearwardly over the top of divider board 46. FIG. 2 illustrates the reciprocal movement of sickle 28 through slot 40 in skid wall 39 as sickle 28 reaches the lateral extremity of its cutting stroke. Support rod 48 angles rearwardly and upwardly at an angle of between 20° and 30° to the horizontal, thereby offering a minimum obstruction to the rearward passage of grain stalks draped over the top of divider board 46. The rearwardly moving grain stalks pass over the rear end of divider boards 46 and then are guided down onto conveyor belts 18 and 19 by inwardly and downwardly turned guide rod 52. Although guide rod 52 is not absolutely essential to the proper functioning of grain dividers 32, I have found that it is very helpful in directing cut grain stalks onto the conveyor belts. In any case, cut grain stalks will drop freely and continuously from the rear, top end of divider boards 46 onto conveyor belts 18 and 19 through the open space provided between the rear end of divider boards 46 and rear wall structure 14, 16. Inwardly turned lip 60 on inside divider board sections 53 acts as a grain catcher and serves to deflect grain stalks dropping from panel 53 onto conveyor belts 18 and 19.

Those skilled in the art will readily appreciate that by supporting my divider assemblies 32 entirely from the front end of platform frame 10 and thereby leaving an opening at the rear end of the divider panels through which grain may drop freely onto the conveyor belts, I have substantially eliminated the problem of having cut grain stalks collect on various portions of the divider board and its support structure and the resultant plugging of the windrower. Since there will be substantially no cut grain stalks being caught on the divider board or on any of its support structure, there will be no accumulation of grain stalks to be caught on the ends of reel 1 and carried around by it, and to block the rearward movement of additional cut grain stalks onto the conveyor belts. Cut grain stalks bent from the inside out over the top of divider boards 46 will move smoothly and easily to the rear over the gradually rising top edge of divider boards 46 and will drop in an unimpeded manner onto the conveyor belts. Uncut grain stalks bent from the outside in over divider boards 46 will be separated thereby from the cut grain stalks and deflected to the outside of the windrower platform as the windrower moves forward. It will also be appreciated that the cutting action of the windrower sickle will be improved by avoiding accumulations of cut grain on the divider boards. Grain stalks collecting on the divider boards tend to block the entry of additional grain stalks along the lateral extremities of sickle 28 adjacent inside divider board panels 53. If additional stalks of grain cannot be moved rearwardly by rotary reel 1 onto the conveyor belts at these points because of grain accumulations on the divider boards, such grain stalks will be stripped rather than being cut cleanly by sickle 28, thus leaving a narrow strip of uncut, stripped grain on the ground. Such improper cutting action is avoided by my improved divider board design.

I claim:
1. On a windrower having a grain reel rotatably supported on a substantially horizontal axis above a laterally reciprocal sickle, and a platform on which a transversely movable grain conveyor is supported, said platform having an upright wall structure at the rear thereof, an improved grain divider structure on each side of said platform comprising:
   a substantially upright divider board having a nose portion projecting forwardly in front of said sickle and a rear portion extending upwardly and rearwardly from said nose portion over said conveyor, said rear portion terminating at its rear end in front of said upright wall structure;
   an open, completely unobstructed grain discharge space defined between said rear end of said divider board and said upright wall structure, said space extending vertically from the top of said divider board rear end to said conveyor;
   support means mounting said dividing board on the front end of said platform frame, said support means serving as the sole means for supporting said divider board in an upright position and no portion of said support means projecting rearwardly beyond said rear portion of said divider board, whereby said grain discharge space is unobstructed and serves as a passage through which cut grain stalks may fall freely onto said conveyor, said support means comprising a base skid attached to the forward edge of said platform frame and projecting forwardly therefrom to said nose portion of said divider board;
   an elongated rod connected to the forward end of said base skid and smoothly rounded adjacent its point of connection to said skid to provide said nose portion of said divider board, said rod extending upwardly and rearwardly along the top edge of said divider board from said nose portion beyond said rear end of said divider board to a point above said conveyor and curving downwardly and inwardly towards said conveyor at its rear, free end; and
   said divider board being supported along its upper edge on said rearwardly and upwardly extending portion of said rod, and said divider board having its bottom edge attached to said base skid.

2. A windrower and grain divider structure as defined in claim 1 wherein:
   said base skid is substantially V-shaped in a horizontal plane and has its apex at said nose portion of said divider board, and said rod is connected at its lower end to said apex of said skid; and
   said divider board is comprised of a single sheet of material folded over said rod to provide two downwardly depending, spaced-apart panel sections angling outwardly and downwardly with respect to each other and attached at their lower edges to the opposite sides of said base skid, said panel sections being curved at their forward ends to conform to the shape of said rounded rod and said forward ends of said panel sections being attached to said apex of said base skid in covering relation thereto, whereby said forward ends of said panel sections define a blunt, rounded and rearwardly tapering nose portion of said divider board.

3. A windrower and grain divider structure as defined in claim 1 wherein:
   said base skid angles upwardly from its point of connection to the front edge of said platform frame and supports said nose portion of said divider board slightly above ground level; and
   said support rod extends rearwardly and upwardly at an angle of between 20° and 30° to the horizontal, thereby offering a minimum obstruction to the rearward passage of grain stalks passing rearwardly thereover.